(12) United States Patent
Gutta et al.

(10) Patent No.: US 7,308,133 B2
(45) Date of Patent: Dec. 11, 2007

(54) SYSTEM AND METHOD OF FACE RECOGNITION USING PROPORTIONS OF LEARNED MODEL

(75) Inventors: Srinivas Gutta, Buchanan, NY (US); Miroslav Trajkovic, Ossining, NY (US); Vasanth Philomin, Briarcliff Manor, NY (US)

(73) Assignee: Koninklijke Philips Elecyronics N.V., Eindhoven (NL)

( * ) Notice: Subject to any disclaimer, the term of this patent is extended or adjusted under 35 U.S.C. 154(b) by 583 days.

(21) Appl. No.: 09/966,408

(22) Filed: Sep. 28, 2001

(65) Prior Publication Data

US 2003/0063780 A1  Apr. 3, 2003

(51) Int. Cl.
*G06K 9/62* (2006.01)
*G06K 9/68* (2006.01)

(52) U.S. Cl. ............ 382/159; 382/160; 382/224; 382/225; 382/226

(58) Field of Classification Search ............ 382/115, 382/117, 118, 155–160, 190, 191, 224–227, 382/276, 282, 291, 299, 294–296
See application file for complete search history.

(56) References Cited

U.S. PATENT DOCUMENTS 6,778,705 B2 * 8/2004 Gutta et al. ............ 382/224

OTHER PUBLICATIONS

Lorente et al., "Face Recognition of Video Sequences in a MPEG-7 Context Using a Global Eigen Approach," IEEE 1999, pp. 187-191.*

Gutta et al., "Mixture of Experts for Classification of Gender, Ethnic Origin, and Pose of Human Faces," IEEE 2000, pp. 948-960.*

Kiminori Sato et al., "Partial Face Recognition using Radial Basis Function Networks", IEEE, pp. 288-293, 1998.*

Colmenarez A.J., et al., "Maximum Likelihood Face Detection", Proceedings of the Second International Conference on Automatic Face and Gesture Recognition, Oct. 14-16, 1996.

Gutta S., et al., "Mixture of Experts for Classification of Gender, Ethnic Origin, and Pose of Human Faces", IEEE Transactions of Neural Networks, vol. 11, No. 4, Jul. 2000.

Bishop C.M., "Neural Networks for Pattern Recognition", pp. 179-182, 1995.

Kittler J., et al., "Combining Classifiers", Proceedings of the ICPR, vol. II, Track B, 1996.

Liu Z., et al., "Robust Head Motion Computation by Taking Advantage of Physical Properties", IEEE Computer Society, Dec. 7-8, 2000, pp. 73-77.

* cited by examiner

Primary Examiner—Brian Le

(57) ABSTRACT

A system and method for classifying facial image data, the method comprising the steps of: training a classifier device for recognizing one or more facial images and obtaining corresponding learned models the facial images used for training; inputting a vector including data representing a portion of an unknown facial image to be recognized into the classifier; classifying the portion of the unknown facial image according to a classification method; repeating inputting and classifying steps using a different portion of the unknown facial image at each iteration; and, identifying a single class result from the different portions input to the classifier.

19 Claims, 2 Drawing Sheets

SYSTEM AND METHOD OF FACE RECOGNITION USING PROPORTIONS OF LEARNED MODEL

BACKGROUND OF THE INVENTION

1. Field of the Invention

The present invention relates to face recognition systems and particularly, to a system and method for performing face recognition using proportions of the learned model.

2. Discussion of the Prior Art

Existing face recognition systems attempt to recognize an unknown face by matching against prior instances of that subject's face(s). This is typically performed by training a classifier against prior instances of a subject's face and then using the trained classifier to identify the subject by matching against new instances of that subjects face. As known, training a classifier involves learning a model of the subject's face. Existing systems use the whole model during classification.

While the ultimate goal in the design of any pattern recognition system is to achieve the best possible classification (predictive) performance, this objective traditionally has led to the development of different classification schemes for any pattern recognition problem to be solved. The results of an experimental assessment of the different designs would then be the basis for choosing one of the classifiers (model selection) as a final solution to the problem. It has been observed in such design studies, that although one of the designs would yield the best performance, the sets of patterns misclassified by the different classifiers would not necessarily overlap as recognized by Kittler J., Hatef, H. and Duin, R. P. W. in the reference entitled "Combining Classifiers, in Proceedings of the $13^{th}$ International Conference on pattern Recognition", Vol. II, pp. 897-901, Vienna, Austria, 1996. This suggested that different classifier designs potentially offered complementary information about the patterns to be classified, which could be harnessed to improve the overall performance.

It had been a common practice in the application of neural networks to train many different candidate networks and then select the best, on the basis of performance on an independent validation set for instance, and to keep only this network and to discard the rest. There are two disadvantages with such an approach. First, all of the effort involved in training the remaining networks is wasted. Second, the generalization performance on the validation set has a random component due to the noise in the data, and so the network which had best performance on the validation set might not be the one with the best performance on new or unseen test data. These drawbacks can be overcome by combining the networks together to form a committee of networks. The importance of such an approach is that it can lead to significant improvements in the predictions on new data, while involving little additional computational effort. In fact the performance of a committee can be better than the performance of the best single network used in isolation as recognized by Bishop C. M., in the reference entitled "Neural Networks for Pattern Recognition," Oxford Press, Oxford, UK, pp. 364-377, 1997.

In order to recognize faces, recognition systems have employed multiple classifiers each trained on profiles of an individual face. On presentation of a probe (test image), the probe is matched with each of the learned model and the scores obtained from each classifier are used up to arrive at a consensus decision. An obvious disadvantage of training multiple classifiers is that a lot of time and space is wasted in training and storing the model files.

It would be highly desirable to provide a face recognition system and methodology whereby instead of having multiple classifiers trained on various profiles of an individual face, a single classifier may be trained on either a frontal face or multiple profiles of an individual's face.

It would further be highly desirable to provide a face recognition system and method wherein proportions of a subject's model is implemented and used to match against different proportions of a subject's face. That is, during testing, an unknown facial image is identified by matching different proportions of the learned model and the unknown facial image.

SUMMARY OF THE INVENTION

Accordingly, it is an object of the present invention to provide a system and method implementing a classifier (e.g., RBF networks) that may be trained to recognize either a frontal face or multiple profiles of an individual's face.

It is a further object of the present invention to provide a face recognition system and method implementing a single classifier device that has been trained on a subject's frontal profile of the face and, during testing, taking an unknown test image and match it against the learned model using different proportions.

Preferably, after matching against each proportion, a probability of match is determined and the scores are then combined to arrive at a consensus decision. For example, each proportion classified will generate a vote. That is, if ten (10) proportions are used, 10 votes would be obtained. Then, a simple voting rule (e.g., if six (6) out of ten (10) are for 'A' then the identity of the subject is 'A') is used to ascertain the identity of the individual.

In accordance with the principles of the invention, there is provided a system and method for classifying facial image data, the method comprising the steps of: training a classifier device for recognizing one or more facial images and obtaining corresponding learned models the facial images used for training; inputting a vector including data representing a portion of an unknown facial image to be recognized into the classifier; classifying the portion of the unknown facial image according to a classification method; repeating inputting and classifying steps using a different portion of the unknown facial image at each iteration; and, identifying a single class result from the different portions input to the classifier.

Advantageously, although an RBF classifier may be used, it is understood that one could use other methods as well, including combinations of various probabilistic/stochastic methods.

BRIEF DESCRIPTION OF THE DRAWINGS

Details of the invention disclosed herein shall be described below, with the aid of the figures listed below, in which.

DETAILED DESCRIPTION OF THE PREFERRED EMBODIMENTS

For purposes of description, a Radial Basis Function ("RBF") classifier is implemented although any classification method/device may be implemented. A description of an RBF classifier device is available from commonly-owned, co-pending U.S. patent application Ser. No. 09/794,443 entitled CLASSIFICATION OF OBJECTS THROUGH MODEL ENSEMBLES filed Feb. 27, 2001, the whole contents and disclosure of which is incorporated by reference as if fully set forth herein.

Figure 1:
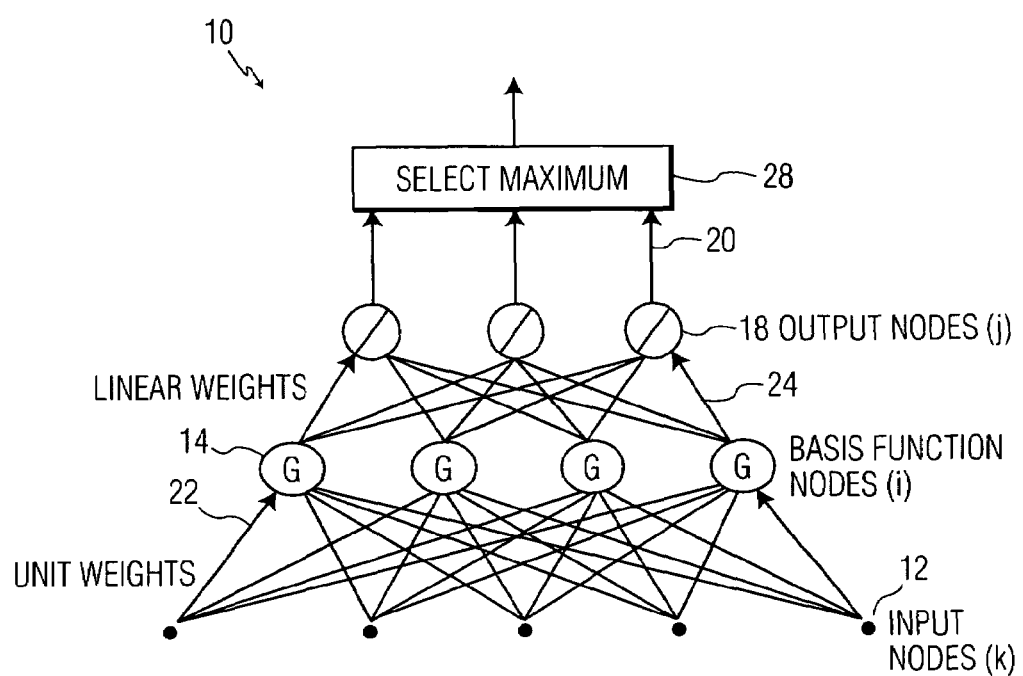
FIG. 1 generally illustrates the architecture of a traditional three-layer back-propagation network 10 according to which an RBF network implemented in accordance with the principles of the present invention is structured.

The construction of an RBF network as disclosed in commonly-owned, co-pending U.S. patent application Ser. No. 09/794,443, is now described with reference to FIG. 1. As shown in FIG. 1, the basic RBF network classifier 10 is structured in accordance with a traditional three-layer back-propagation network 10 including a first input layer 12 made up of source nodes (e.g., k sensory units); a second or hidden layer 14 comprising i nodes whose function is to cluster the data and reduce its dimensionality; and, a third or output layer 18 comprising j nodes whose function is to supply the responses 20 of the network 10 to the activation patterns applied to the input layer 12. The transformation from the input space to the hidden-unit space is non-linear, whereas the transformation from the hidden-unit space to the output space is linear. In particular, as discussed in the reference to C. M. Bishop, Neural Networks for Pattern Recognition, Clarendon Press, Oxford, 1997, the contents and disclosure of which is incorporated herein by reference, an RBF classifier network 10 may be viewed in two ways: 1) to interpret the RBF classifier as a set of kernel functions that expand input vectors into a high-dimensional space in order to take advantage of the mathematical fact that a classification problem cast into a high-dimensional space is more likely to be linearly separable than one in a low-dimensional space; and, 2) to interpret the RBF classifier as a function-mapping interpolation method that tries to construct hypersurfaces, one for each class, by taking a linear combination of the Basis Functions (BF). These hypersurfaces may be viewed as discriminant functions, where the surface has a high value for the class it represents and a low value for all others. An unknown input vector is classified as belonging to the class associated with the hypersurface with the largest output at that point. In this case, the BFs do not serve as a basis for a high-dimensional space, but as components in a finite expansion of the desired hypersurface where the component coefficients, (the weights) have to be trained.

In further view of FIG. 1, the RBF classifier 10, connections 22 between the input layer 12 and hidden layer 14 have unit weights and, as a result, do not have to be trained. Nodes in the hidden layer 14, i.e., called Basis Function (BF) nodes, have a Gaussian pulse nonlinearity specified by a particular mean vector $\mu_i$ (i.e., center parameter) and variance vector $\sigma_i^2$ (i.e., width parameter), where i=1, ..., F and F is the number of BF nodes. Note that $\sigma_i^2$ represents the diagonal entries of the covariance matrix of Gaussian pulse (i). Given a D-dimensional input vector X, each BF node (i) outputs a scalar value $y_i$ reflecting the activation of the BF caused by that input as represented by equation 1) as follows:

$$y_i = \phi_i(\|X - \mu_i\|) = \exp\left[-\sum_{k=1}^{D} \frac{(x_k - \mu_{ik})^2}{2h\sigma_{ik}^2}\right] \quad (1)$$

Where h is a proportionality constant for the variance, $X_k$ is the $k^{th}$ component of the input vector $X=[X_1, X_2, \ldots, X_D]$, and $\mu_{ik}$ and $\sigma_{ik}^2$ are the $k^{th}$ components of the mean and variance vectors, respectively, of basis node (i). Inputs that are close to the center of the Gaussian BF result in higher activations, while those that are far away result in lower activations. Since each output node 18 of the RBF network forms a linear combination of the BF node activations, the portion of the network connecting the second (hidden) and output layers is linear, as represented by equation 2) as follows:

$$z_j = \sum_i w_{ij} y_i + w_{oj} \quad (2)$$

where $z_j$ is the output of the $j^{th}$ output node, $y_i$ is the activation of the $i^{th}$ BF node, $w_{ij}$ is the weight 24 connecting the $i^{th}$ BF node to the $j^{th}$ output node, and $w_{oj}$ is the bias or threshold of the $j^{th}$ output node. This bias comes from the weights associated with a BF node that has a constant unit output regardless of the input.

An unknown vector X is classified as belonging to the class associated with the output node j with the largest output $z_j$. The weights $w_{ij}$ in the linear network are not solved using iterative minimization methods such as gradient descent. They are determined quickly and exactly using a matrix pseudoinverse technique such as described in above-mentioned reference to C. M. Bishop, Neural Networks for Pattern Recognition, Clarendon Press, Oxford, 1997.

A detailed algorithmic description of the preferable RBF classifier that may be implemented in the present invention is provided herein in Tables 1 and 2. As shown in Table 1, initially, the size of the RBF network 10 is determined by selecting F, the number of BFs nodes. The appropriate value of F is problem-specific and usually depends on the dimensionality of the problem and the complexity of the decision regions to be formed. In general, F can be determined empirically by trying a variety of Fs, or it can set to some constant number, usually larger than the input dimension of the problem. After F is set, the mean $\mu_I$ and variance $\sigma_I^2$ vectors of the BFs may be determined using a variety of methods. They can be trained along with the output weights using a back-propagation gradient descent technique, but this usually requires a long training time and may lead to suboptimal local minima. Alternatively, the means and variances may be determined before training the output weights. Training of the networks would then involve only determining the weights.

The BF means (centers) and variances (widths) are normally chosen so as to cover the space of interest. Different techniques may be used as known in the art: for example, one technique implements a grid of equally spaced BFs that sample the input space; another technique implements a clustering algorithm such as k-means to determine the set of BF centers; other techniques implement chosen random vectors from the training set as BF centers, making sure that each class is represented.

Once the BF centers or means are determined, the BF variances or widths $\sigma_I^2$ may be set. They can be fixed to some global value or set to reflect the density of the data vectors in the vicinity of the BF center. In addition, a global proportionality factor H for the variances is included to allow for rescaling of the BF widths. By searching the space of H for values that result in good performance, its proper value is determined.

After the BF parameters are set, the next step is to train the output weights $w_{ij}$ in the linear network. Individual training patterns X(p) and their class labels C(p) are presented to the classifier, and the resulting BF node outputs $y_i(p)$, are computed. These and desired outputs $d_j(p)$ are then used to determine the F×F correlation matrix "R" and the F×M output matrix "B". Note that each training pattern produces one R and B matrices. The final R and B matrices are the result of the sum of N individual R and B matrices, where N is the total number of training patterns. Once all N patterns have been presented to the classifier, the output weights $w_{ij}$ are determined. The final correlation matrix R is inverted and is used to determine each $w_{ij}$.

TABLE 1

1. Initialize
   (a) Fix the network structure by selecting F, the number of basis functions, where each basis function I has the output where k is the component index.

$$y_i = \phi_i(\|X - \mu_i\|) = \exp\left[-\sum_{k=1}^{D} \frac{(x_k - \mu_{ik})^2}{2h\sigma_{ik}^2}\right],$$

(b) Determine the basis function means $\mu_I$, where I = 1, ..., F, using K-means clustering algorithm.
   (c) Determine the basis function variances $\sigma_I^2$, where I = 1, ..., F.
   (d) Determine H, a global proportionality factor for the basis function variances by empirical search 2. Present Training
   (a) Input training patterns X(p) and their class labels C(p) to the classifier, where the pattern index is p = 1, ..., N.
   (b) Compute the output of the basis function nodes $y_I(p)$, where I = 1, ..., F, resulting from pattern X(p).

$$R_{il} = \sum_p y_i(p) y_l(p)$$

(c) Compute the F × F correlation matrix R of the basis function outputs:
   (d) Compute the F × M output matrix B, where $d_j$ is the desired output and M is the number of output classes:

$$B_{lj} = \sum_p y_l(p) d_j(p), \text{ where } d_j(p) = \begin{cases} 1 & \text{if } C(p) = j \\ 0 & \text{otherwise,} \end{cases}$$

and j = 1, ..., M.

3. Determine Weights
   (a) Invert the F × F correlation matrix R to get $R^{-1}$.
   (b) Solve for the weights in the network using the following equation:

$$w_{ij}^* = \sum_l (R^{-1})_l B_{lj}$$

As shown in Table 2, classification is performed by presenting an unknown input vector $X_{test}$ to the trained classifier and computing the resulting BF node outputs $y_i$. These values are then used, along with the weights $w_{ij}$, to compute the output values $z_j$. The input vector $X_{test}$ is then classified as belonging to the class associated with the output node j with the largest $z_j$ output.

TABLE 2

1. Present input pattern portion $X_{test}$ to the classifier
2. Classify a portion of $X_{test}$
   (a) Compute the basis function outputs, for all F $$y_i = \phi(\|X_{test} - \mu_i\|)$$

basis functions

TABLE 2-continued (b) Compute output node activations:

$$z_j = \sum_i w_{ij} y_i + w_{oj}$$

(c) Select the output $z_j$ with the largest value and classify $X_{test}$ portion as the class j;
   (d) Repeat steps 2(a)-2(c) using different proportions of decreased size.

In the method of the present invention, the RBF input consists of n-size normalized facial gray-scale images fed to the network as one-dimensional, i.e., 1-D, vectors. The hidden (unsupervised) layer 14, implements an "enhanced" k-means clustering procedure, such as described in S. Gutta, J. Huang, P. Jonathon and H. Wechsler, Mixture of Experts for Classification of Gender, Ethnic Origin, and Pose of Human Faces, IEEE Transactions on Neural Networks, 11(4):948-960, July 2000, the contents and disclosure of which is incorporated by reference as if fully set forth herein, where both the number of Gaussian cluster nodes and their variances are dynamically set. The number of clusters may vary, in steps of 5, for instance, from ⅕ of the number of training images to n, the total number of training images. The width $\sigma_I^2$ of the Gaussian for each cluster, is set to the maximum (the distance between the center of the cluster and the farthest away member—within class diameter, the distance between the center of the cluster and closest pattern from all other clusters) multiplied by an overlap factor o, here equal to 2. The width is further dynamically refined using different proportionality constants h. The hidden layer 14 yields the equivalent of a functional shape base, where each cluster node encodes some common characteristics across the shape space. The output (supervised) layer maps face encodings ('expansions') along such a space to their corresponding ID classes and finds the corresponding expansion ('weight') coefficients using pseudoinverse techniques. Note that the number of clusters is frozen for that configuration (number of clusters and specific proportionality constant h) which yields 100% accuracy on ID classification when tested on the same training images.

Figure 2:
FIG. 2 illustrates a sample set of facial images fed to the network.

According to the invention, the input vectors to be used for training are full facial images, for example the facial images 30 shown in FIG. 2, each comprising a size of 64×72 pixels, for example. According to the invention, a single classifier (RBF network 10, is trained with these full images. However, during actual testing, different proportions of the test image are tested against different proportions of the model, For instance, step 2 of the classification algorithm depicted in Table 2, is an iterative process that performs a subtraction of the unknown test image with a different portion of the learned model in each iteration. Training is on a full face a full image and an $X_{test}$ (full image) may be input at the first iteration. A first output score is obtained, which includes a confidence (probability) measure, e.g., as illustrated as step 2(c) in Table 2, having a value between 0 and 1, and a label identifying the class label (learned model). At each iteration, these steps are repeated each time using a different percentage of the image, i.e., portions of the learned model. For example, in a next iteration, a smaller potion of the unknown image, e.g., 90%, may be compared against the corresponding 90% of the learned model image for each class, and so on. As a result of each comparison, a further a confidence (probability) measure and a label identifying the class (learned model) is determined by the classifier device.

Thus, as indicated in Table 2, the whole of step 2(a) is in a loop with the process repeated any number of times depending upon the number of proportions desired. For example, as selectable by a user, the $X_{test}$ image portions utilized may range from maximum (e.g., 100% of the fill image) to minimum (e.g., 50% of the full image) at a 10% or 5% portion reduction at each iteration. As described in commonly-owed, co-pending U.S. patent application Ser. No. 09/966,436 entitled SYSTEM AND METHOD OF FACE RECOGNITION THROUGH ½ FACES, the whole disclosure and contents of which is incorporated by reference as if fully set forth herein, when the minimum image is used, i.e., 50%, it is imperative that at least one eye, ½ the nose and ½ the mouth of the facial image be captured, e.g., a vertical proportion of the image. The granularity of the portion reduction at each iteration may be a user selectable option and may depend on how good that data is and the computation cost consideration. It should be understood that a trade-off exists between the performance and cost. For instance, depending upon the level of security desired, i.e., the more secure the application, the finer granularity of proportion reduction at each iteration, and the greater number of comparisons will be performed at greater cost. For the case of 100% to 50% in with 10% image reduction proportions at each step there will be a total of six (6) confidence scores and class labels, whereby with 5% image reduction proportions at each step there will be a total of twelve (12) for each class. After the scores have been accumulated, rules may be applied to determine the class for the test image. For example, the scores may be combined to arrive at a consensus decision. One simple class may be majority rule however, more sophisticated rules may be applied. e.g., such as described in the reference to J. Kittler, M. Hateg. and R. P. W. Duin entitled "Combining Classifiers," Proc. Of the $13^{th}$ International Conference on Pattern Recognition, II: 897-901, Vienna, Austria, August 1996, the contents and disclosure of which is incorporated by reference herein. For example, each proportion classified will generate a vote and if ten (10) proportions are used, 10 votes would be obtained. Then, a majority decision voting rule simple voting rule (e.g., if six (6) out of ten (10) are for "A" then the identity of the subject is "A") is used to ascertain the identity of the individual (class). In response, multiple votes are generated and, in the classifier, as shown in FIG. 1, a selection device is 28 is provided with logic for applying voting rules to arrive at an appropriate decision.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A method for classifying facial image data, the method comprising the steps of:
   a) training a neural network classifier device for recognizing one or more facial images and
      obtaining corresponding learned models of the facial images used for training;
   b) inputting a vector including data representing a portion of an unknown facial image to be recognized into said classifier;
   c) classifying said portion of said unknown facial image according to a classification method at each iteration, comparing a portion of the unknown image against a corresponding portion of the learned model image for each class, and
      obtaining a confidence score for each classified portion;
   d) repeating step b) and c) using a different portion of said unknown facial image at each iteration; and,
   e) identifying a single class result from said different portions input to said classifier, applying a rule to said confidence scores to obtain said single class result, said confidence score is a probability measure that a current portion of an unknown facial image is identified with a class, said applied rule including obtaining class having majority of class labels determined for each unknown facial image.

2. The method of claim 1, wherein said classifying step c) includes decreasing at each iteration, the portion of the unknown image being tested and,
   comparing the decreased portion of the unknown image against a corresponding decreased portion of the learned model image for each class.

3. The method of claim 2, wherein said portions are decreased from 100% of the unknown facial image to 50% of the unknown facial image at equal decrements.

4. The method of claim 1, wherein a Radial Basis Function Network is implemented for training and classifying each image portion.

5. The method of claim 1, wherein the classifying step c) comprises outputting a class label identifying a class to which the detected unknown facial image portion corresponds to and a probability value indicating the probability with which the unknown facial image pattern belongs to the class.

6. A method for classifying facial image data, the method comprising the steps of:
   a) training a neural network classifier device for recognizing one or more facial images and
      obtaining corresponding learned models of the facial images used for training, wherein a Radial Basis Function Network is implemented for training and classifying each image portion, said training step comprises:
      i) initiating the Radial Basis Function Network, the initializing step comprising the steps of:
         fixing the network structure by selecting a number of basis functions F, where each basis function I has the output of a Gaussian non-linearity,
         determining the basis function means $\mu_I$ where I=1, . . . , F, using a K-means clustering algorithm,
         determining the basis function variances $\sigma_I^2$, and
         determining a global proportionality factor H, for the basis function variances by empirical search;
      ii) presenting the training, the presenting step comprising the steps of:
         inputting training patterns X(p) and their class labels C(p) to the classification method, where the pattern index is p=1, . . . , N,
         computing the output of the basis function nodes $y_I(p)$, F, resulting from pattern X(p);
         computing the F×F correlation matrix R of the basis function outputs; and
         computing the F×M output matrix B, where $d_j$ is the desired output and M is the number of output classes and j=1, . . . , M, and
      iii) determining weights, the determining step comprising the steps of:
         inverting the F×F correlation matrix R to get R_; and
         solving for the weights in the network;

b) inputting a vector including data representing a portion of an unknown facial image to be recognized into said classifier;
c) classifying said portion of said unknown facial image according to a classification method;
d) repeating step b) and c) using a different portion of said unknown facial image at each iteration; and,
e) identifying a single class result from said different portions input to said classifier.

7. A method for classifying facial image data, the method comprising the steps of:
  a) training a neural network classifier device for recognizing one or more facial images and
  obtaining corresponding learned models of the facial images used for training, wherein a Radial Basis Function Network is implemented for training and classifying each image portion, wherein said training step comprises:
    i) initiating the Radial Basis Function Network, the initializing step comprising the steps of:
    fixing the network structure by selecting a number of basis functions F, where each basis function I has the output of a Gaussian non-linearity;
    determining the basis function means $\mu_I$ where I=1, ..., F, using a K-means clustering algorithm;
    determining the basis function variances $\sigma_I^2$; and
    determining a global proportionality factor H, for the basis function variances by empirical search;
    ii) presenting the training, the presenting step comprising the steps of:
    inputting training patterns X(p) and their class labels C(p) to the classification method, where the pattern index is p=1, ..., N,
    computing the output of the basis function nodes $y_I(p)$, F, resulting from pattern X(p),
    computing the F×F correlation matrix R of the basis function outputs, and
    computing the F×M output matrix B, where $d_j$ is the desired output and M is the number of output classes and j=1, ..., M and
    iii) determining weights, the determining step comprising the steps of:
    inverting the F×F correlation matrix R to get $R^{-1}$; and
    solving for the weights in the network;
  b) inputting a vector including data representing a portion of an unknown facial image to be recognized into said classifier;
  c) classifying said portion of said unknown facial image according to a classification method, the classifying step further comprising:
    presenting each $X_{test}$ portion at each iteration to the classification method and classifying each $X_{test}$ by computing the basis function outputs, for all F basis functions, computing output node activations, and selecting the output $Z_j$ with the largest value and classifying the $X_{test}$ portion as a class j;
  d) repeating step b) and c) using a different portion of said unknown facial image at each iteration; and,
  e) identifying a single class result from said different portions input to said classifier.

8. An apparatus for classifying facial image data comprising:
  a neural network classifier device trained for recognizing one or more facial images and generating corresponding learned models associated with the facial images used for training;
  means for iteratively inputting a vector each including data representing a portion of an unknown facial image to be recognized into said classifier, a different image portion being input to said classifier at each iteration, said classifier device classifying each said portion of said unknown facial image according to a classification method;
  means for identifying a single class result from said different portions input to said classifier.

9. The apparatus of claim 8, wherein said classifier includes:
  a mechanism for comparing a portion of the unknown image against a corresponding portion of the learned model image for each class, at each iteration; and, obtaining a confidence score for each classified portion.

10. The apparatus of claim 9, wherein said means for identifying applies a rule to said confidence scores to obtain said single class result.

11. The apparatus of claim 9, including mechanism for decreasing each portions of each unknown facial image being tested at each iteration and, comparing the decreased portion of the unknown image against a corresponding decreased portion of the learned model image for each class.

12. The apparatus of claim 11, wherein said portions are decreased from 100% of the unknown facial image to 50% of the unknown facial image at equal decrements.

13. The apparatus of claim 8, wherein a Radial Basis Function Network is implemented for training and classifying each image portion.

14. An apparatus for classifying facial image data comprising:
  a neural network classifier device trained for recognizing one or ore facial images and generating corresponding learned models associated with the facial images used for training;
  means for iteratively inputting a vector each including data representing a portion of an unknown facial image to be recognized into said classifier, a different image portion being input to said classifier at each iteration, said classifier device classifying each said portion of said unknown facial image according to a classification method,
    said classifier includes a mechanism for comparing a portion of the unknown image against a corresponding portion of the learned model image for each class, at each iteration and obtaining a confidence score for each classified portion,
    said confidence score is a probability measure that a current portion of an unknown facial image is identified with a class, said applied rule including identifying class having majority of class labels determined for each unknown facial image; and
  means for identifying a single class result from said different portions input to said classifier, said means for identifying applies a rule to said confidence scores to obtain said single class result.

15. A computer-readable medium embodying a program of instructions to perform method steps for classifying facial image data, the method comprising the steps of:
  a) training a neural network classifier device for recognizing one or more facial images and
  obtaining corresponding learned models the facial images used for training;
  b) inputting a vector including data representing a portion of an unknown facial image to be recognized into said classifier;

c) classifying said portion of said unknown facial image according to a classification method at each iteration, comparing of the unknown image against a corresponding portion of the learned model image for each class, and obtaining a confidence score for each classified portion;

d) repeating step b) and c) using a different portion of said unknown facial image at each iteration; and, e) identifying a single class result from said different portions input to said classifier, applying a rule to said confidence score to obtain said single class result, said confidence score is a probability measure that a current portion of an unknown facial image is identified with a class, said applied rule including obtaining class having majority of class labels determined for each unknown facial image.

16. A method for classifying facial image data, the method comprising:

training a classifier device for recognizing one or more facial images and obtaining corresponding learned models the facial images used for training;

inputting a vector including data representing a portion of an unknown facial image to be recognized into said classifier;

classifying said portion of said unknown facial image according to a classification method;

repeating the inputting and classifying using a different portion of said unknown facial image at each iteration; and, identifying a single class result from said different portions input to said classifier; and wherein:

the classifying includes: at each iteration, comparing a portion of the unknown image against a corresponding portion of the learned model image for each class; and obtaining a confidence score for each classified portion, the confidence score being a probability measure that a current portion of an unknown facial image is identified with a class, an applied rule including obtaining class having majority of class labels determined for each unknown facial image; and the identifying includes applying the rule to said confidence scores to obtain said single class result.

17. A method for classifying facial image data, the method comprising:

training a classifier device for recognizing one or more facial images and obtaining corresponding learned models the facial images used for training;

inputting a vector including data representing a portion of an unknown facial image to be recognized into the classifier;

classifying the portion of the unknown facial image according to a classification method;

repeating the inputting and classifying using a different portion of the unknown facial image at each iteration; and, identifying a single class result from the different portions input to the classifier;

and wherein:

a Radial Basis Function Network is implemented for training and classifying each image portion; and the training includes:

initiating the Radial Basis Function Network, the initializing including: fixing the network structure by selecting a number of basis functions F, where each basis function I has the output of a Gaussian non-linearity; determining the basis function means $\mu_I$ where $I=1, \ldots, F$, using a K-means clustering algorithm; determining the basis function variances $\sigma_I^2$; and determining a global proportionality factor H, for the basis function variances by empirical search;

presenting the training, the presenting including: inputting training patterns X(p) and their class labels C(p) to the classification method, where the pattern index is $p=1, \ldots, N$; computing the output of the basis function nodes $Y_I(p)$, F, resulting from pattern X(p); computing the F×F correlation matrix R of the basis function outputs; and computing the F×M output matrix B, where $d_j$ is the desired output and M is the number of output classes and $j=1, \ldots, M$; and determining weights, the determining including: inverting the F×F correlation matrix R to get $R_{-1}$; and solving for the weights in the network.

18. The method of claim 17, wherein the classifying includes:

presenting each Xtest portion at each iteration to the classification method; and classifying each Xtest by:

computing the basis function outputs, for all F basis functions;

computing output node activations; and selecting the output zj with the largest value and classifying the Xtest portion as a class j.

19. Apparatus for classifying facial image data comprising:

a classifier device trained for recognizing one or ore facial images and generating corresponding learned models associated with the facial images used for training;

means for iteratively inputting a vector each including data representing a portion of an unknown facial image to be recognized into the classifier, a different image portion being input to the classifier at each iteration, the classifier device classifying each the portion of the unknown facial image according to a classification method;

means for identifying a single class result from the different portions input to the classifier, and wherein:

the classifier includes: a mechanism for comparing a portion of the unknown image against a corresponding portion of the learned model image for each class, at each iteration; and, obtaining a confidence score for each classified portion;

the means for identifying applies a rule to the confidence scores to obtain the single class result; and the confidence score is a probability measure that a current portion of an unknown facial image is identified with a class, the applied rule including identifying class having majority of class labels determined for each unknown facial image.

* * * * *